United States Patent [19]

Stockhausen et al.

[11] Patent Number: 5,526,385
[45] Date of Patent: *Jun. 11, 1996

[54] SAFETY DEVICE PROTECTING AGAINST OVERPRESSURE FAILURE OF A NUCLEAR REACTOR PRESSURE VESSEL

[75] Inventors: Horst-Dieter Stockhausen, Nürnberg; Hartmut Seidelberger, Erlangen; Gerhard Hau, Albstadt; Josef Hollmann, Schlüsselfeld, all of Germany

[73] Assignee: Siemens Aktiengesellschaft, Munich, Germany

[ * ] Notice: The term of this patent shall not extend beyond the expiration date of Pat. No. 5,459,768.

[21] Appl. No.: 298,680

[22] Filed: Aug. 31, 1994

Related U.S. Application Data

[63] Continuation of PCT/DE93/00181, Mar. 2, 1993.

[30] Foreign Application Priority Data

Mar. 3, 1992 [DE] Germany .......................... 42 06 658.1

[51] Int. Cl.[6] ..................................... G21C 9/004
[52] U.S. Cl. ........................................ 376/284; 220/89.4
[58] Field of Search ............................ 376/284, 283, 376/247; 220/89.4; 137/72; 236/92 C

[56] References Cited

U.S. PATENT DOCUMENTS

| | | | |
|---|---|---|---|
| 4,232,796 | 11/1980 | Hudson, Jr. et al. | 220/89.4 |
| 4,567,016 | 1/1986 | Tong | 376/283 |
| 4,777,013 | 10/1988 | Wolters et al. | 376/283 |
| 4,836,443 | 6/1989 | Wolters et al. | 376/283 |
| 5,080,857 | 1/1992 | Miller et al. | 376/284 |

FOREIGN PATENT DOCUMENTS

| | | |
|---|---|---|
| 18171/67 | 8/1968 | Australia . |
| 0221298 | 5/1987 | European Pat. Off. . |
| 0247518 | 12/1987 | European Pat. Off. . |
| 0302678 | 2/1989 | European Pat. Off. . |
| 832979 | 1/1952 | Germany . |
| 1789050 | 1/1972 | Germany . |
| 7521957 | 11/1975 | Germany . |
| 7827717 | 3/1979 | Germany . |
| 3526377 | 2/1987 | Germany . |
| 505391 | 5/1939 | United Kingdom . |
| 972474 | 10/1964 | United Kingdom . |
| 2029050 | 3/1980 | United Kingdom . |

*Primary Examiner*—Daniel D. Wasil
*Attorney, Agent, or Firm*—Herbert L. Lerner; Laurence A. Greenberg

[57] ABSTRACT

A nuclear reactor has a core and a pressure vessel with a wall and an interior. A pressure relief responding as a function of temperature is provided in the case of insufficient core cooling (due to a highly improbable failure of the cooling devices and emergency cooling devices). A safety device protecting against overpressure failure of the pressure vessel upon insufficient cooling of the core includes a pressure pipe passing pressure-tightly through the wall and extending into the interior of the pressure vessel. The pressure pipe has at least one pressure compensation opening formed therein in the interior of the pressure vessel and has a fusible sealing body sealing the pressure compensation opening. The fusible sealing body is formed of a melting solder melting at a limit temperature, such as 600° to 700° C., and unblocking the pressure compensation opening, but keeping the pressure compensation opening sealed during normal operation. The pressure pipe in particular is a blow-off pipe with a pressure relief opening. However, the pressure pipe can also be a pressure control pipe, with which a blow-off valve provided outside the vessel can be triggered for reducing the system pressure.

17 Claims, 5 Drawing Sheets

SAFETY DEVICE PROTECTING AGAINST OVERPRESSURE FAILURE OF A NUCLEAR REACTOR PRESSURE VESSEL

CROSS-REFERENCE TO RELATED APPLICATION

This application is a Continuation of International application Ser. No. PCT/DE93/00181, filed Mar. 2, 1993.

BACKGROUND OF THE INVENTION

Field of the Invention

The invention relates to a safety device protecting against overpressure failure of a nuclear reactor pressure vessel due to overpressure in the event of insufficient core cooling.

A relief device for a pressure vessel is described in Australian Patent No. 18,171/67. The relief device includes a fusible plug which is fitted in such a way that it blocks a flow channel leading out of the pressure vessel. The plug is constructed in such a way that it is solid below a critical temperature and breaks up at the critical temperature.

If, in a nuclear power station in general and in a pressurized-water reactor nuclear power station in particular, the extremely improbable failure of all of the cooling devices of the reactor core is assumed, there is a risk of the reactor core being overheated. In a pressurized-water nuclear power station, an inadmissible overpressure in the primary circuit is avoided by the pressurizer system with spray devices and blow-off devices. A blow-off vessel serves to condense the steam blown off upon opening of the pressurizer valves, blow-off valves and relief valves and of the volume control system relief valves. The blow-off vessel is filled with water up to about two thirds, and above that is a nitrogen cushion. In pressurized-water reactors, the pressure in the primary circuit is, for example, 158 bar.

The invention starts from the consideration of substantially reducing the blow-off response pressure in a cooling circuit of a nuclear reactor, especially in the primary circuit of a pressurized-water reactor, as a function of temperature, in such a way that in the highly improbable case of overheating of the reactor core, the primary circuit pressure is automatically reduced to values below 30 bar.

SUMMARY OF THE INVENTION

It is accordingly an object of the invention to provide a safety device protecting against overpressure failure of a nuclear reactor pressure vessel, which overcomes the hereinafore-mentioned disadvantages of the heretofore-known devices of this general type and which allows the above-stated criterion to be fulfilled and therefore forms a barrier against failure of the nuclear reactor pressure vessel due to overpressure in the case of core overheating.

With the foregoing and other objects in view there is provided, in accordance with the invention, in a nuclear reactor having a core and a pressure vessel with a wall and an interior, a safety device protecting against overpressure failure of the pressure vessel upon insufficient cooling of the core, comprising a pressure pipe passing pressure-tightly through the wall and extending into the interior of the pressure vessel, the pressure pipe having at least one pressure compensation opening formed therein in the interior of the pressure vessel and having a fusible sealing body sealing the at least one pressure compensation opening; the fusible sealing body being formed of a melting solder melting at a limit temperature and unblocking the at least one pressure compensation opening, but keeping the at least one pressure compensation opening sealed during normal operation.

The limit temperature is preferably within a range of from 600° C. to 700° C.

In accordance with another feature of the invention, the pressure pipe is a blow-off pipe and the pressure compensation opening is a pressure relief opening. In this case, the safety device serves to degrade the pressure directly with the pressure pipe leading, as a blow-off line, into a blow-off vessel outside the pressure vessel.

In accordance with a further feature of the invention, for purposes of indirect pressure degradation, the pressure pipe is a pressure control pipe, by means of which a blow-off valve provided outside the vessel can be triggered for reducing the system pressure.

In accordance with an added feature of the invention, regarding the measurement location and the mounting of the pressure pipe, the pressure pipe is sealingly guided in a suspended configuration through a cover branch of the pressure vessel and extends with a perforated pipe head sealed by means of the fusible sealing body into the interior of the pressure vessel. This perforated pipe head is then located, for example, in the immediate vicinity of the upper core grid plate and, in the event of overheating of the core or of the upper core region, would very rapidly "sense" the increase in temperature.

In accordance with an additional feature of the invention, which does not require a penetration of the cover, the pressure pipe is positioned with a perforated pipe head sealed by means of the fusible sealing body underneath the reactor core, in particular inside a lower core structure, and is laid downwards in the interior of a bottom hemisphere and next to it in an annular space (between the core vessel and the pressure vessel wall) upwards up to a pressure-tight penetration located in a wall region between main coolant branches. Since the lower core structure is located in the immediate vicinity of the reactor core and is connected with metallic conductivity to the core vessel, the perforated pipe head is also able to reliably and rapidly "sense" core overheatings at this point.

In accordance with yet another feature of the invention, the pressure pipe is constructed as a blow-off pipe, the perforated pipe head is sealed at the end surface by a pipe plug and has a plurality of mutually adjacent pressure compensation openings in its pipe shell wall, and the pressure compensation openings are sealed by a fusible sleeve soldered to the pipe shell wall.

In accordance with yet a further feature of the invention, for reasons of redundancy and of achieving a sufficiently large blow-off cross-section, there is provided a plurality of adjacent rings of pressure compensation openings being coaxial with the pipe.

In accordance with yet an added feature of the invention, the pipe plug has a conical profile with a rounded tip, in order to minimize the influence upon the normal coolant flow in the interior of the pressure vessel.

If the pressure pipe being used is a pressure control pipe, as already stated above, the passage cross-section of the pipe as well as of its pressure compensation openings can be made smaller than in the case of a blow-off pipe.

In accordance with yet an additional feature of the invention, the pressure pipe which is constructed as a pressure control pipe is sealed at its end extending into the interior of the pressure vessel, in particular by a cover, and has at least one pressure compensation opening in its shell wall, inside which a spherical metal body is embedded in a fusible sealing body.

In accordance with again another feature of the invention, the pressure compensation opening is an oblique opening having an opening axis which is oriented obliquely inwards, so that, in the event of fusion, the spherical metal body drops into the interior of the pressure control pipe.

In accordance with again a further feature of the invention, a brazing silver alloy with a relatively high silver content (for example 50%) is used as the melting solder for the fusible sealing body.

In accordance with again an added feature of the invention, the desired limit temperature region, which advantageously is at 700° C., for example, can be adjusted by means of the melting solder alloy.

In accordance with a concomitant feature of the invention, the silver solder is temperature and radiation-resistant below the response temperature.

Other features which are considered as characteristic for the invention are set forth in the appended claims.

Although the invention is illustrated and described herein as embodied in a safety device protecting against overpressure failure of a nuclear reactor pressure vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
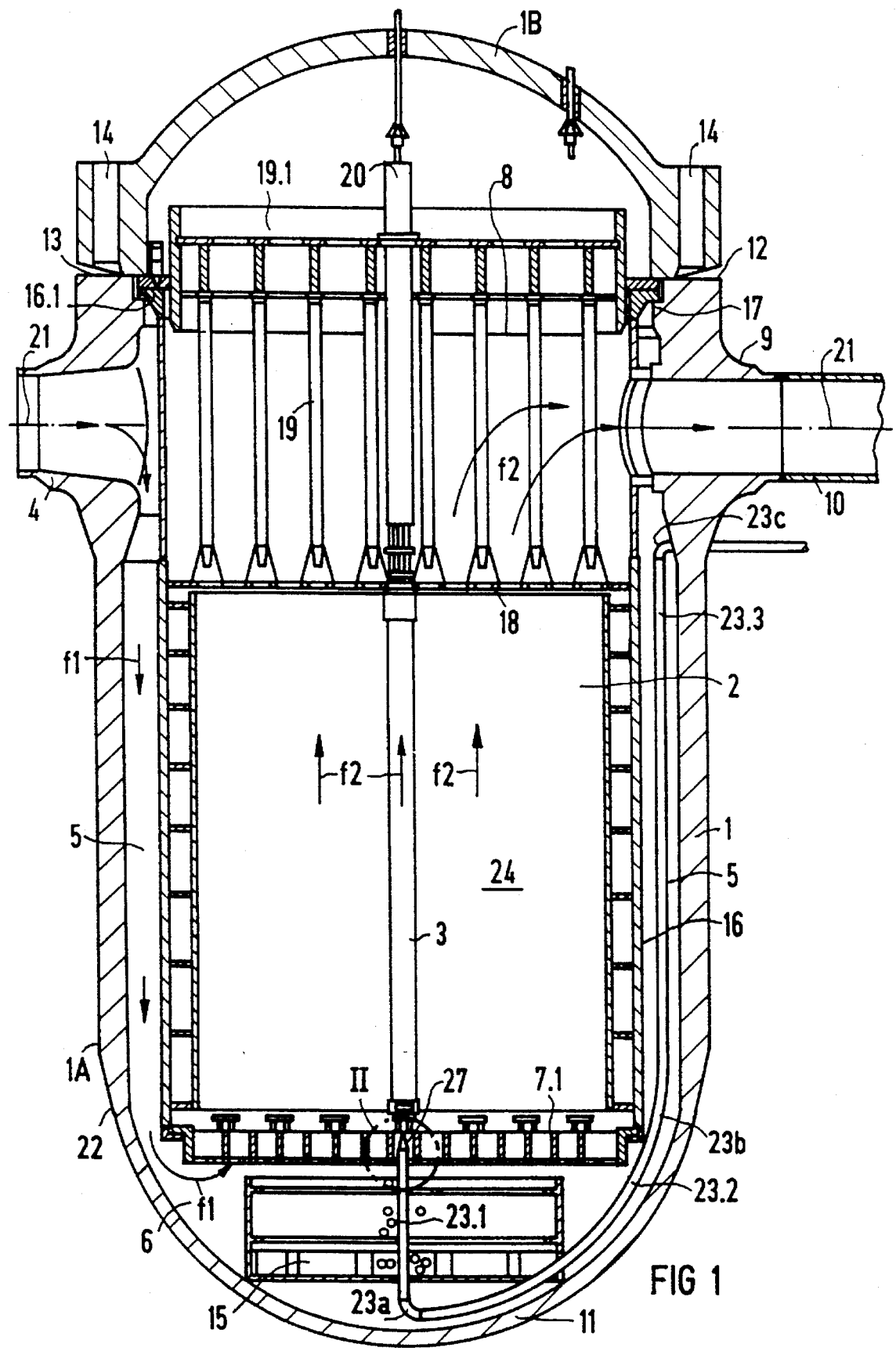
FIG. 1 is a fragmentary, diagrammatic, longitudinal-sectional view of a reactor pressure vessel with a pressure pipe which is constructed as a blow-off pipe and which has a perforated pipe head that is positioned in the vicinity of a lower core structure.

Referring now to the figures of the drawing in detail and first, particularly, to FIG. 1 thereof, there is seen a simplified, sectional view of a nuclear reactor pressure vessel 1 (referred to below as a pressure vessel) of a pressurized-water nuclear power station which is constructed, for example, for a thermal reactor output of 3765 MW corresponding to an electrical gross output of 1300 MW. A reactor core 2 which is assembled from fuel assemblies, of which only a single fuel assembly 3 is shown, is cooled by light water which enters through inlet branches 4 and flows downwards in an annular space 5 (as is seen by flow arrows f1). Cooling water flows from a lower plenum 6, through a perforated lower grate 7, upwards through cooling channels of the fuel assemblies 3 (as is seen by flow arrows f2) in which it is heated, and then flows from an upper plenum 8 through outlet branches and through a so-called hot primary circuit line 10 (shown sectionally) that is connected thereto, to a non-illustrated steam generator, where it releases its heat through heat-exchanging tubes to a secondary coolant. The cooling water flow through the reactor core 2, the upper plenum 8 and the outer branches 9 is made clear by the flow arrows f2 that were already mentioned above. The cooled cooling water, which is also referred to as the primary coolant, is pumped back from the steam generator, through a non-illustrated so-called cold primary circuit line, to the inlet branch 4 of the pressure vessel 1, so that a continuous circulation is established in normal operation. In normal operation, the primary coolant is under a pressure of about 158 bar in the primary circuit and therefore also within the pressure vessel 1, and the coolant temperature at the outlet branch 9 is about 329° C. The reactor pressure vessel 1 with its internals is constructed for this pressure and temperature stress plus a safety margin. The reactor pressure vessel 1 is formed of a pot-shaped lower vessel part 1A with a bottom hemisphere 11 and an annular flange 12 at its upper end, to which a domed cover 1B having a counter-flange 13 is bolted to make a seal (cover bolts are not shown, but bolt penetration openings 14 are shown). Only the most important internals will be mentioned, namely a lower screen barrel 15 and the already-mentioned lower grate 7 which is disposed above the lower screen barrel at a small distance and which forms a bottom of a core vessel 16. The core vessel 16 is suspended by a support flange 16.1 on a ring shoulder 17 of the annular flange 12 and has a lower part which takes up the core 2 with the individual fuel assemblies 3. The core 2 is covered by an upper grid plate 18 on which a guide structure 19 having an upper support plate 19.1 is supported. Control rods 20, which can be lowered or raised for reactivity control by non-illustrated control rod drives and are disposed above the cover 1B, dip into some of the fuel assemblies. In a four-loop unit, four outlet branches 9 and four inlet branches 4 are alternately located in a plane 21—21 and distributed over the periphery of the pressure vessel 1. The coolant, which is held under a supercritical pressure and is therefore liquid, not only covers the core 2, but also fills the upper plenum 8 approximately up to the upper support plate 19.1 in normal operation. This therefore also ensures effective cooling of those internals which, although they do not themselves generate any heat (such as the fuel assemblies 3), are subject to so-called gamma-heating by gamma-radiation. If the water level in the pressure vessel drops due to an extremely improbable failure of all cooling devices and emergency cooling devices, the component temperature (normally about 400° C.) begins to rise and heat is increasingly released, in particular by radiation and conduction, to the pressure vessel 1, in particular if the water level has fallen down to the upper grid plate 18 or even a little below that. This overheating is utilized in the still relatively early stage by the safety device according to the invention for reliably preventing a failure of the pressure vessel 1 due to overpressure in the event of the insufficient core cooling.

Figure 2:
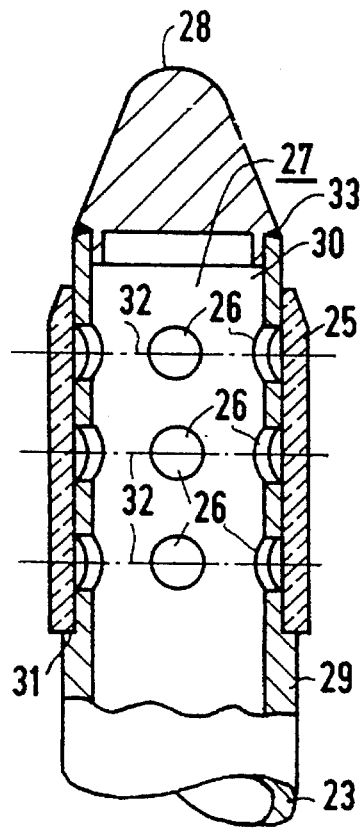
FIG. 2 is an enlarged view of a portion II of the perforated pipe head of FIG. 1.

As is seen in FIG. 1 in conjunction with FIG. 2, for this purpose, a pressure pipe 23 passes through a wall 22 of the pressure vessel 1 in a pressure-tight manner, it extends into the interior of the pressure vessel 1, which is indicated as a whole with reference numeral 24, and it has at least one pressure compensation opening 26 which is disposed in the interior 24 of the pressure vessel and is sealed by a fusible sealing body 25. The pressure pipe 23 is a blow-off pipe and the pressure compensation opening 26 is a pressure relief opening, which is shown as a plurality of pressure compensation openings 26 in a perforated pipe head 27 in FIG. 2.

According to FIGS. 1 and 2, the pressure pipe 23 with the perforated pipe head 27 is sealed by means of the fusible sealing body 25, which is positioned underneath the reactor core 2, preferably within the lower core structure or grate 7, and in particular directly underneath a grid plate 7.1, on which the fuel assemblies 3 rest with their lower ends or bottom plates. The perforated pipe head 27 with its fusible sealing body 25 thus forms a heat sensor which can very quickly react to an overheating of the core. For this purpose, the fusible sealing body 25 is formed of a melting solder which melts at a limit temperature in the region of, for example, 600° to 700° C. and unblocks the pressure compensation openings 26, but keeps the pressure compensation openings 26 sealed during normal operation. A brazing solder based on a silver alloy with a high silver content of, for example, 50% is particularly suitable as the melting solder, because such a brazing solder does not show any fatigue phenomena up to or almost up to its response temperature and withstands forces caused by a differential pressure. In addition, such a solder is resistant to radiation.

The pressure pipe 23 is guided with a first pipe section 23.1 vertically downwards from the perforated pipe head 27 through the lower grate 7 and the adjacent screen barrel 15, that is to say within the interior of the bottom hemisphere 11. The pressure pipe 23 then has a first bending point 23a and is laid in an arc at a distance from the inner periphery as a second pipe section 23.2 up to the annular space 5 between the outer periphery of the core vessel 16 and the inner periphery of the lower pressure vessel part 1A, where it is laid vertically upwards from a second bending point 23b as a straight pipe piece 23.3 up to a third bending point 23c. At the third bending point 23c, the direction of the pressure pipe 23 changes from vertically parallel to the axis to horizontally perpendicular to the axis, and the pressure pipe is laid outwards through a non-illustrated pressure-tight penetration with an outer pipe piece 23.4 that leads to non-illustrated a blow-off vessel.

The perforated pipe head 27 shown in FIG. 2 is sealed at its end surface by a pipe plug 28. The perforated pipe head 27 is preferably provided with a plurality of the mutually adjacent pressure compensation openings 26 in a pipe shell wall 29 thereof. This plurality of pressure compensation openings 26 is sealed by the fusible sleeve 25 that was already mentioned above and is soldered to the pipe shell wall 29. The fusible sleeve 25 is fittingly seated at a narrowed end 30 of the pressure pipe 23 and is axially secured by bearing against a shoulder 31 formed by the narrowing. A plurality of mutually adjacent rings 32 of the pressure compensation openings 26, which are three in the present case, are coaxial with the pipe. Each ring 32 includes four pressure compensation openings 26 distributed over the periphery of the pressure pipe 23. As is shown, the pipe plug 28 has a conical profile with a rounded tip, and it is inserted into the end of the pressure pipe 23 and fixed by a girth weld 33.

The pressure pipe 23 according to FIGS. 1 and 2 (and also according to FIG. 3 to be explained below) is a blow-off pipe, so that the openings 26 are blow-off openings. Outside the pressure vessel 1, the pressure pipe 23 leads to a non-illustrated blow-off valve which discharges or feeds the blow-off steam into a blow-off vessel. This blow-off valve can open, preferably under pressure control, in such a way that it opens when a control pressure that is taken from the arriving pressure pipe 23 reaches a minimum value, for example 30 bar. In normal operation, the interior of the pressure pipe 23 is unpressurized, or normal atmospheric pressure prevails therein.

Figure 3:
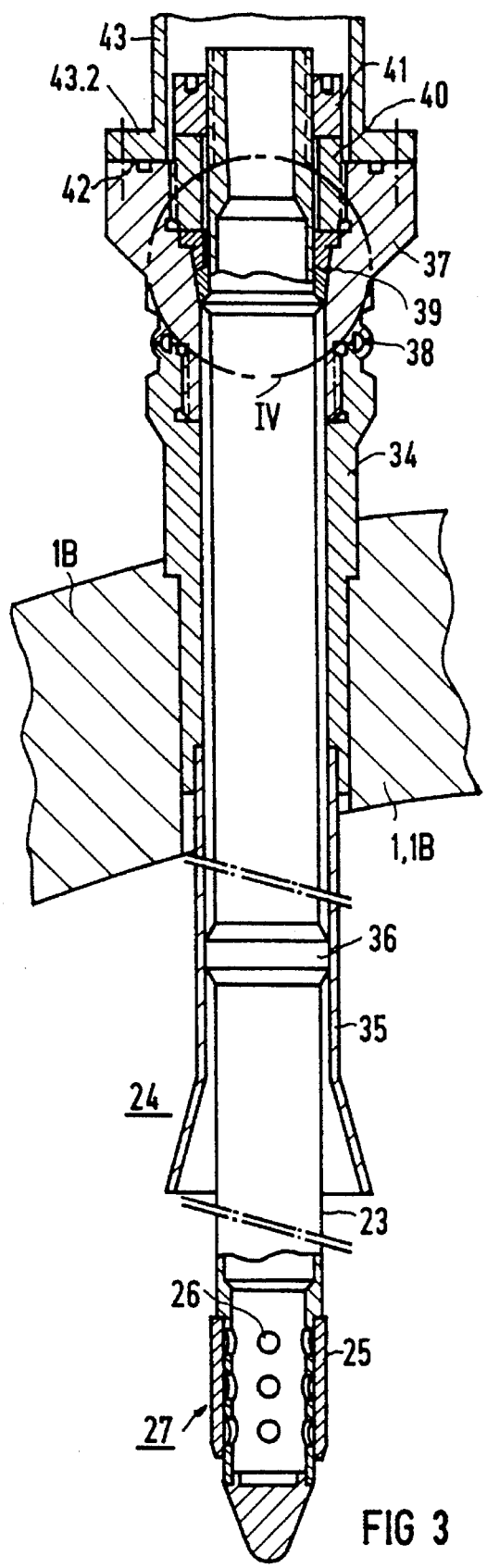
FIG. 3 is an enlarged, fragmentary, longitudinal-sectional view of a second illustrative embodiment of a pressure pipe constructed as a blow-off pipe, which is taken sealingly through a cover branch of the pressure vessel in a suspended configuration.
Figure 4:
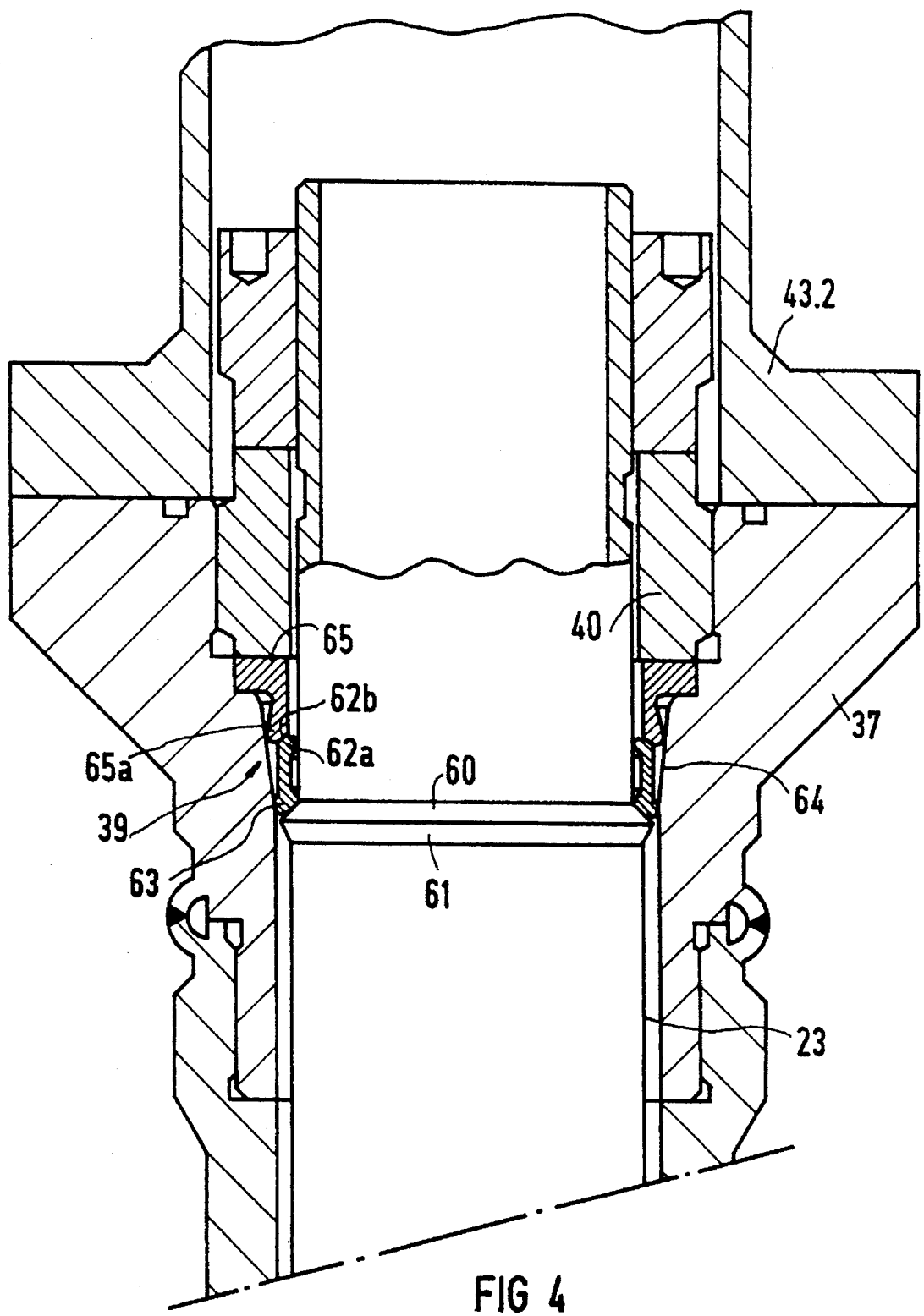
FIG. 4 is a further enlarged view of a portion IV of FIG. 3.

In the second illustrative embodiment according to FIGS. 3 and 4, the pressure pipe 23 is sealingly guided in a suspended configuration through a cover branch or support 34 of the pressure vessel 1 and extends with the perforated pipe head 27, that is sealed by means of the fusible sealing body or the fusible sleeve 25, into the interior 24 of the pressure vessel 1 (as is seen in FIG. 1). The cover branch 34 is extended downwards by a guard pipe 35 that is conically widened at its end, and the perforated pipe 23 is provided along its length with guide rings 36 by means of which it is guided for axially sliding under the action of heat on the inner periphery of the guard pipe 35 or of the cover branch 34. At the outer end of the cover branch 34, a pressure-tight penetration for the pressure pipe 23 is provided in which a penetration housing 37 has a lower end that is bolted to the upper end of the cover branch 34 and is welded to be pressure-tight by a girth weld 38. The penetration housing 37 forms a receptacle for a conical ring gasket 39 and a nut 40, pressing the ring gasket 39 into a tight seating with a securing nut 41.

As is seen in FIG. 4, a first sealing ring 62 is held with a lower rounded end 63 thereof against a collar 61 of the pressure pipe 23, which is provided with a conical all-around seating surface 60. The rounded end is also forced against a conical surface 64 on the inner periphery of the penetration housing 37. An upper end of the first sealing ring 62 is of a conical/rounded shape. A rounded part 62a is forced against the pressure pipe 23. A second sealing ring 65 is forced with a downward-projecting rounded-conical end 65a against an all-around conical surface 62b of the first sealing ring 62, with the rounded part being held against the conical inner peripheral surface 64 of the penetration housing 37. Thus, two respective all-around sealing seats 63/60, 63/64 and 62/23, 65/64 of the two sealing rings 63/65 result, on the outer periphery of the pressure pipe 23 and on the inner periphery (inner peripheral surface 64) of the penetration housing 37 relative to the pressure pipe 23 and the penetration housing 27, respectively, as well as an all-around sealing seat 62b/65a between the respective first and second sealing rings 62 and 65.

A blow-off line 43 is pressure-tightly flanged by a ring flange 43.2 to a ring flange 42 of the penetration housing 37. The perforated pipe head 27 in the example according to FIG. 3 is of the same construction as that according to FIG. 2. The advantage of the safety device according to FIGS. 1 and 2 as compared with that according to FIG. 3 is that, during a change of a fuel assembly and unbolting of the vessel cover 1B, the pressure pipe 23 does not have to be removed, as is the case in the example according to FIG. 3. In this example, it is advantageous that the pressure pipe 23 can be taken up to the upper grid plate or up to a point close to this grid plate, so that overheating of the core can be detected very rapidly at an early stage.

Figure 6:
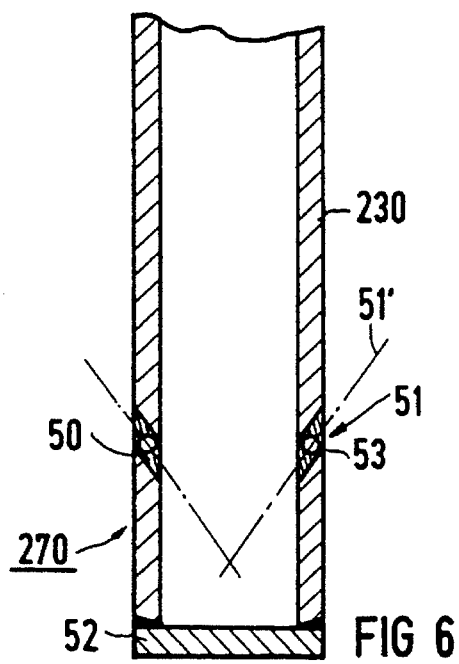
FIG. 6 is an enlarged view of a portion VI of FIG. 5.
Figure 5:
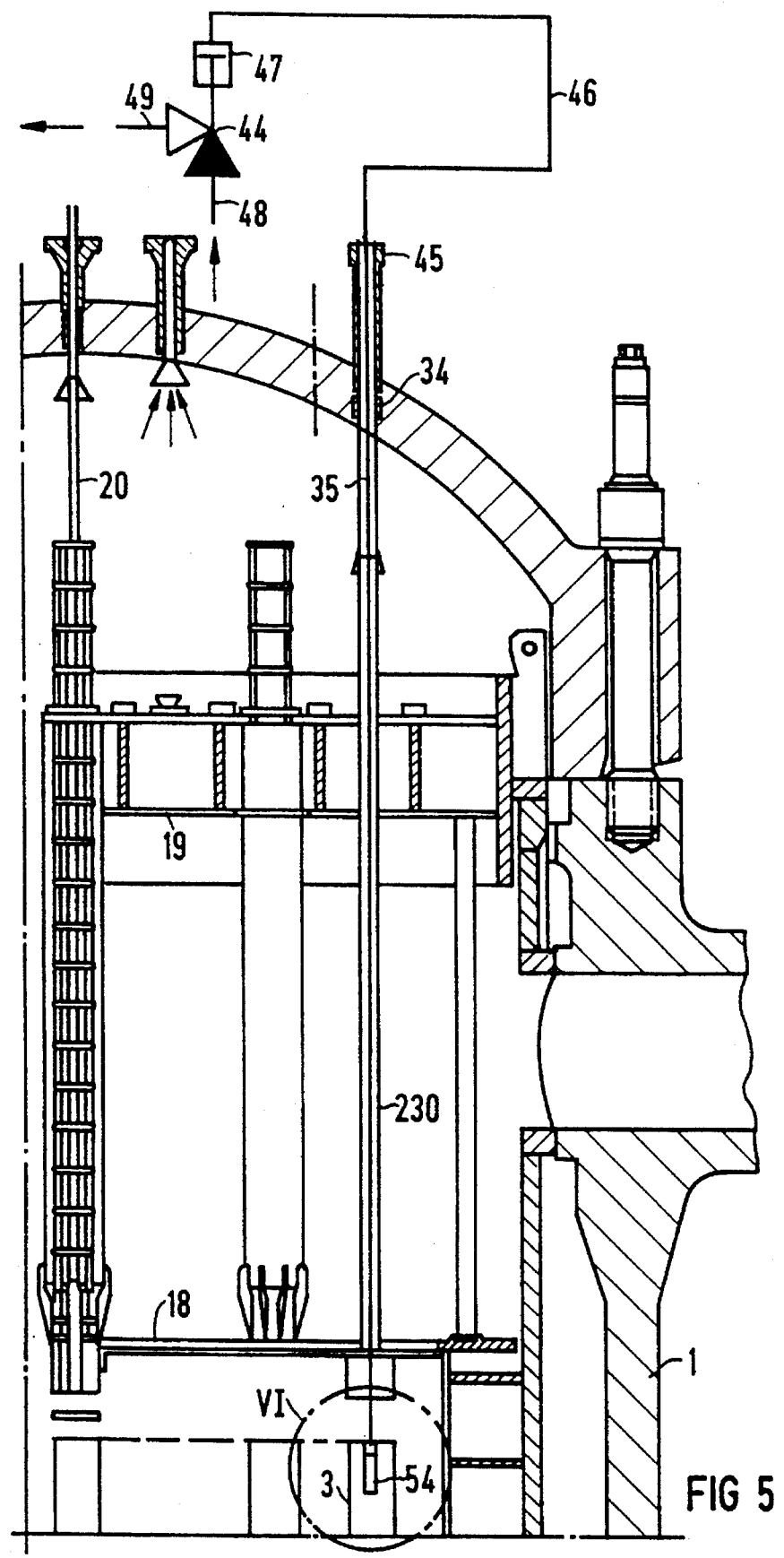
FIG. 5 is an enlarged, fragmentary, partial longitudinal-sectional view of a third illustrative embodiment of an upper region of a reactor pressure vessel with a pressure pipe constructed as a pressure control pipe, a perforated pipe head sealed by a melting solder at a lower end thereof, a cover penetration at an upper end of the pressure pipe, a connected control line and a diagrammatically indicated blow-off valve.

In the third illustrative embodiment according to FIGS. 5 and 6, a pressure pipe 230 is a pressure control pipe, by means of which a valve 44, which is provided externally of the vessel for reducing the system pressure, can be triggered. For this purpose, the pressure pipe 230 is pressure-tightly guided through a cover branch or support 34 (in this connection, see FIG. 3). In the vicinity of a pressure-tight connection 45 to a pressure control line 46, a pressure-tight bolting and weld is provided analogously to FIG. 3. The pressure control line 46 is connected to a control piston 47 of the blow-off valve 44 which is constructed, for example, as a three-way valve, and the system pressure being applied through a line 48 to the blow-off valve 44 is diverted by the blow-off valve 44 through a line 49 to the non-illustrated blow-off vessel, when the blow-off valve is shifted into its open position by a control pressure applied to the control piston 47.

The pressure control pipe 230 can have a smaller diameter than the pressure pipe 23 (see FIGS. 1 to 3). As is seen in FIG. 6, this pressure control pipe also has a "heat sensor" in the form of a fusible sealing body 50 being formed of a melting solder which melts at a limiting temperature in the region from, for example, 600° to 700° C. and unblocks the pressure control line 230, but keeps a pressure compensation opening 51 sealed during normal operation. In particular, the pressure control pipe 230 seen in FIG. 6 is sealed at an end thereof extending into the interior of the pressure vessel 1 seen in FIG. 5, by a cover 52. The pressure control pipe 230 has a shell wall in which at least the one pressure compensation opening 51 is formed and inside which a spherical metal body 53 is embedded in the fusible sealing body 50. It is particularly advantageous if the pressure compensation opening 51 is an oblique opening as shown, having an opening axis 51' which is oriented obliquely inwards, so that in the event of fusion, the spherical body 53 drops into the interior of the pressure control pipe 230. Embedding of the spherical body 53 on both sides is shown, i.e. the melting solder 50 seals the pressure compensation opening 51 both outside the spherical body 53 and inside the latter.

In FIG. 5 (in which components that are identical to FIG. 1 bear the same reference numerals), it is shown that the pressure control pipe 230 is guided parallel to the axis of the control rods 20, as a measuring lance in a manner of speaking, through the guide structure 19 and the upper grid plate 18 disposed on the underside thereof, to the head of a fuel assembly 3, where it is fitted into a corresponding receiving bore 54 with the required thermal play. In this region, an excessive temperature is very quickly detected by the perforated pipe head 270 when the coolant level (in the event of a highly improbable failure of the cooling devices and emergency cooling devices of the nuclear reactor) falls down to the level of the lower grid plate 18 or even lower. When this temperature reaches the limit value of, for example, about 700° C., the fusible sealing body 50 melts and the spherical bodies 53 are thrust by the differential pressure into the pressure control pipe 230, so that the pressure can then be compensated for as far as the control piston 47 through the pressure compensation openings 51 which are then free. This control piston opens the blow-off valve 44, the indirectly controlled pressure compensation into the blow-off vessel can start, and it continues until the lower limit value (below 30 bar) has been reached.

We claim:

1. In a nuclear reactor having a core and a pressure vessel with a wall and an interior, a safety device protecting against overpressure failure of the pressure vessel upon insufficient cooling of the core, comprising:

a pressure pipe passing pressure-tightly through the wall and extending into the interior of the pressure vessel, said pressure pipe having at least one pressure compensation opening formed therein in the interior of the pressure vessel and having a fusible sealing body sealing said at least one pressure compensation opening;

said fusible sealing body being formed of a melting solder melting at a limit temperature and unblocking said at least one pressure compensation opening, but keeping said at least one pressure compensation opening sealed during normal operation.

2. The safety device according to claim 1, wherein said pressure pipe is a blow-off pipe and said at least one pressure compensation opening is a pressure relief opening.

3. The safety device according to claim 1, including a blow-off valve disposed outside the vessel, said pressure pipe being a pressure control pipe triggering said blow-off valve for reducing a system pressure.

4. The safety device according to claim 1, wherein the pressure vessel has a cover branch through which said pressure pipe is sealingly guided in a suspended configuration, said pressure pipe having a perforated pipe head being sealed by said fusible sealing body and extended into the interior of the pressure vessel.

5. The safety device according to claim 1, wherein the pressure vessel has a bottom hemisphere with an interior, and main coolant branches defining a region of the pressure vessel wall therebetween, and the pressure vessel contains a core vessel being spaced apart from the pressure vessel wall by an annular space;

said pressure pipe has a perforated pipe head being sealed by said fusible sealing body and disposed underneath the reactor core; and said pressure pipe is laid downwards in the interior of the bottom hemisphere and next to the bottom hemisphere in the annular space upwards up to a pressure-tight penetration of the wall region between the main coolant branches.

6. The safety device according to claim 5, wherein the pressure vessel contains a lower core structure inside which said perforated pipe head is disposed.

7. The safety device according to claim 1, wherein said pressure pipe includes a perforated pipe head having an end surface, having a pipe shell wall with a mutually adjacent plurality of said at least one pressure compensation opening formed therein, and having a pipe plug sealing said end surface, said fusible sealing body being a fusible sleeve soldered to said pipe shell wall for sealing said pressure compensation openings.

8. The safety device according to claim 7, wherein said at least one pressure compensation opening is a plurality of mutually adjacent rings of pressure compensation openings being coaxial with said pressure pipe.

9. The safety device according to claim 7, wherein said pipe plug has a conical profile with a rounded tip.

10. The safety device according to claim 1, wherein said pressure pipe leads outside the pressure vessel as a blow-off line into a blow-off vessel.

11. The safety device according to claim 3, wherein said pressure control pipe has a sealed end extending into the interior of the pressure vessel and has a shell wall having said at least one pressure compensation opening formed therein, and said fusible sealing body has a spherical metal body embedded therein in said at least one pressure compensation opening.

12. The safety device according to claim 11, including a cover sealing said end of said pressure control pipe.

13. The safety device according to claim 11, wherein said at least one pressure compensation opening is an oblique opening having an opening axis being oriented obliquely inward, for dropping said spherical body into the interior of said pressure control pipe in the event of fusion.

14. The safety device according to claim 1, wherein the limit temperature is within a range of from 600° C. to 700° C.

15. The safety device according to claim 1, wherein the melting solder is resistant to radiation.

16. The safety device according to claim 1, wherein the melting solder has a high silver content.

17. The safety device according to claim 1, wherein the melting solder has a silver content of approximately 50%.

* * * * *